…

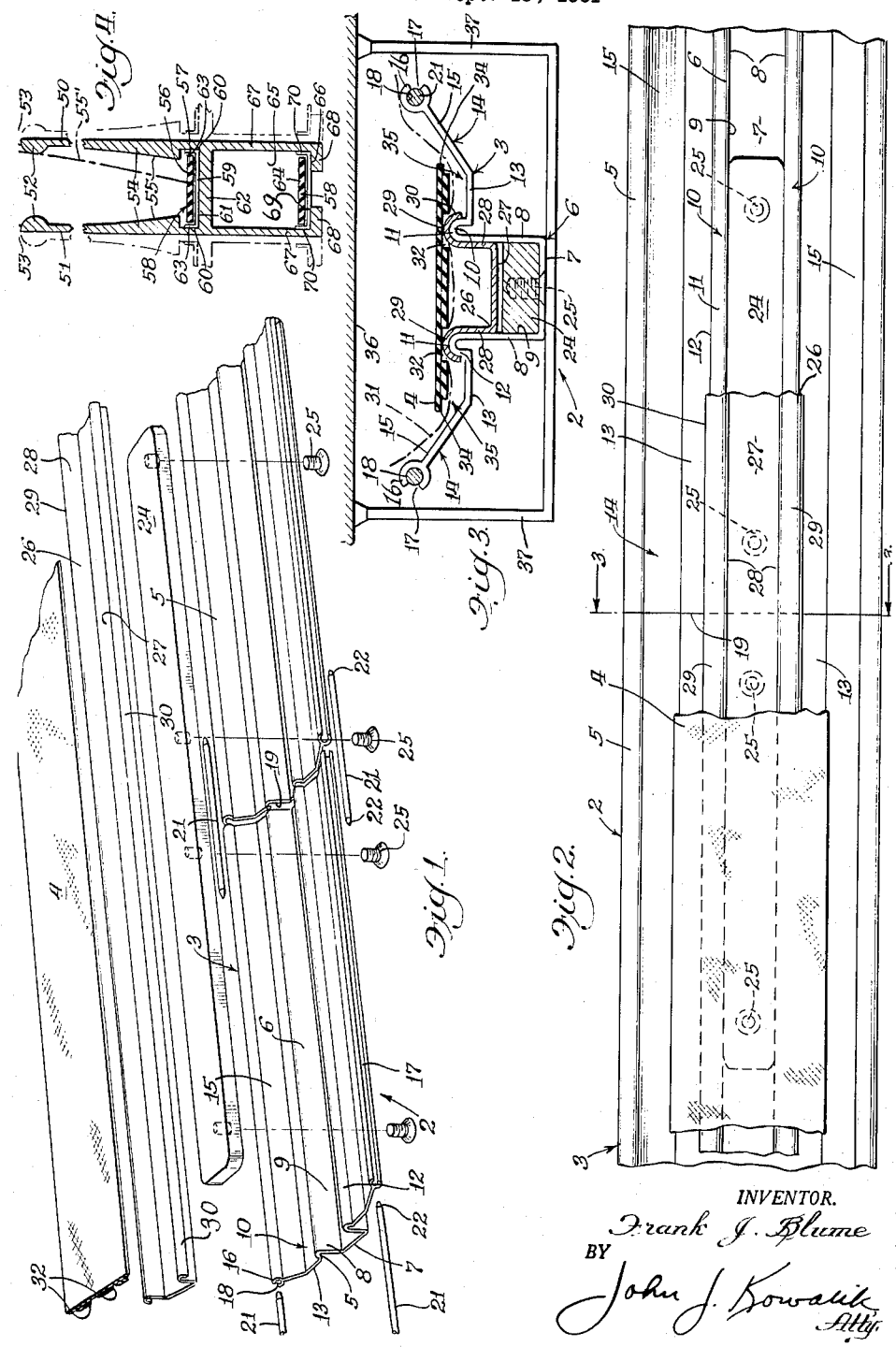
Aug. 3, 1965　　F. J. BLUME　　3,198,319
CONVEYOR STRUCTURE
Filed Sept. 15, 1961
INVENTOR.
Frank J. Blume
BY
John J. Kowalik
Atty.

United States Patent Office 3,198,319
Patented Aug. 3, 1965

3,198,319
CONVEYOR STRUCTURE
Frank J. Blume, 2726 N. Ashland Ave., Chicago, Ill.
Filed Sept. 15, 1961, Ser. No. 140,645
4 Claims. (Cl. 198—204)

This invention relates to conveyors and more particularly to a novel belt conveyor.

Heretofore, in conveyors commonly known in the art as drag belt or index conveyors, it has been the practice to construct the rails or runners, upon which the messages are carried, of sheet metal. Because of its weight heavy supports have had to be used. Installation has been particularly burdensome because of the weight of the material and its relatively inflexible nature. This required extreme care in custom fabrication to minimize on the job changes.

The invention comprehends a novel runner structure made of light weight metal such as aluminum in a novel extruded form such that the cross-sectional shape of the runner develops exceptional strength which resists bending and sagging over long lengths and which thus obviates the necessity for heavy or bulky supporting structure.

The invention has for its one object the provision of a runner of novel form and which is of light weight and adaptable to extrusion in long lengths.

Another object of the invention is to devise a novel and simple interlocking arrangement between adjacent runner lengths which is simple to apply and remove and which utilizes easily fabricated parts.

More specifically the invention comprehends the provision of runners of novel cross-section having a trough shape with outwardly directed lateral flanges which are formed with longitudinally slit beads along their outer edges, the beads having longitudinal bores alignable lengthwise to admit locking pins or rods between adjacent lengths to interlock these lengths to each other.

The invention further provides a runner of novel shape which in addition to the laterally extending longitudinal flanges have an intervening longitudinal medial channel portion with upright side webs and a transverse bottom web, the side webs at their upper edges merging respectively into upwardly convexed longitudinal ridges which curve outwardly of the upright webs and merge into the inner edge portions of the lateral flanges, the medial channel portion developing an upwardly open slot which admits connectors which span adjacent ends of adjacent runner lengths which are bolted to the connector.

A further object is to provide a novel runner shape which minimizes drag of the message thereon.

The invention has as its primary object the provision of a novel insert of steel or plastic or the like providing a primary riding surface upon which articles are dragged by an overlying moving belt whereby the article is prevented from scuffing the aluminum structure which, until the advent of the instant invention, caused sooting to such an extent as to preclude the use of aluminum fabrications.

These and other objects and advantages inherent in and encompassed by the invention will become more apparent from the specifications and the drawings, wherein:

FIGURE 1 is a fragmentary exploded perspective view of the novel conveyor structure;

FIGURE 2 is a plan view;

FIGURE 3 is a sectional view on line 3—3 of FIGURE 2; and

FIGURE 4 is a cross view of a modified form of conveyor structure incorporating the invention.

Describing the invention in detail, there is shown in FIGURES 1-3 a conveyor structure generally designated 2 comprising a runner or track assembly generally indicated 3 and a drag belt 4.

The track assembly comprises a track element 5—5 each of which is of extruded aluminum and comprises a central or intermediate channel or U-section 6 which has a bottom wall 7 and upright walls 8, 8 which define with wall 7 an upwardly open longitudinal slot 9. Each wall 8 terminates in an upper edge upwardly convexed bead portion 10 which has an upper bight portion 11 and a depending outer flange 12, each flange 12 merging with the inboard edge of a substantially horizontal portion 13 of a lateral extension generally indicated 14. The extension 14 continuing from the outboard edge of portion 13 into an upwardly and outwardly extending diagonal portion 15. The portion 15 is provided with split tubular outer edge portions 16 which has a longitudinal outboard slot 17 and a bore 18.

Adjacent track sections are butted up end to end and seat against each other's ends as at 19 while the beads or portions 16 are aligned lengthwise and admit in the bores 18 thereof securing rods 21. Each rod 21 has tapered ends 22 to facilitate insertion into the bores 18.

Adjacent sections are also secured by the bars 24 which complement the slot 9 and straddle the adjacent ends of the two sections and are interconnected to the walls 7 by screws 25, 25.

The feature of the present invention is in the provision of a liner 26 of steel or the like for the aluminum track. In the present instance this liner takes the form of an inverted channel having a bottom wall 27 spaced from wall 7 a distance above the bars 24 to clear the same. The wall 27 merges into upright walls 28, 28 which are disposed adjacent to respective walls 8, 8. The walls 28 each terminate in an upper edge bead having a bight portion 29 overlaying the respective bight portion 11 and a depending flange 30 shielding respective flange 12.

As best seen in FIGURE 3 the belt 4 rides upon the steel insert 26 with the message 31 placed therebetween at intervals as well known to those skilled in the art.

The belt is held away from the wing portions 14 of the conveyor track by means of longitudinal grooves 32, 32 on the underside 33 of the belt, the grooves 32 being spaced from the lateral edges 34 whereby the belt is centered in the trough 35.

It will be understood that in the application of the inserts, these are tightly snapped into the track elements and are so arranged as to bridge the juncture of adjacent sections. The inserts being channel shaped not only conform to the track shape but also add to the vertical or transverse strength thereof to reduce sagging.

Thus the track sections can be supported from the ceiling 36 by a minimum amount of hangers 37 as well known to those skilled in the art.

The structure shown in FIGURE 4 is an index conveyor section which comprises an extruded aluminum track 50 having upright walls 51, 51 which on their external sides are flat to accommodate adjacent runs thereagainst.

Internally the walls 51, 51 have inwardly projecting beads 52, 52 along their upper edges 53 and the intermediate portions of walls 51, 51 are thickened at 54 to provide downwardly sloping surfaces 55 to guide papers or files 55' which are placed between walls 51 onto the top 56 of a top rung 57 conveyor belt 58 which on its underside rests upon a preferably plastic insert 59 such as "Teflon" or polyethylene or nylon and the like which is recessed with the belt into the lateral opposed grooves 60, 60 beneath the thickened portions 54 of the side walls 51.

The insert 59 comprises a bottom wall 61 which seats upon an intermediate transverse wall 62 which merges with walls 51. The lateral edges of wall 61 have integral upright wall or flange portions 63, 63 which engage the walls 51 and flank the lateral edges of the belt to prevent its abrasion of the soft aluminum wall.

The return run 64 of the belt extends beneath the wall 62 through the aperture 65 and rides on a plastic insert 66 which is identical with insert 59 and is confined between the extension 67, 67 of walls 51, 51 and underlying wall portions 68, 68. The return run has its underside 69 riding upon surface of insert 66. The belt extends between the upright flanges 70, 70 of the insert in guided engagement therewith.

I have found that in each of these applications I have solved an extremely vexing problem of erosion by the rubber or elastomer-fabric belt. The problem has assumed such proportions that aluminum extrusions would have been not used except for the instant discovery and invention.

It will be understood that the term "aluminum" is intended to cover any and all alloys of this metal which upon abrasion by a belt would produce a sooting condition.

What is claimed is:

1. In a conveyor for feeding documents, an elongated channel formed of soft erodable metal such as aluminum and comprising a pair of laterally spaced side portions for engaging and supporting a document therebetween, said channel having an intermediate portion flanked by said side portions, said intermediate portion having a bottom and upright sides defining an upwardly open guideway, guide means on said side portions spaced above said bottom of the intermediate portion, a hard metal liner generally U-shaped in cross-section having a bottom section overlying the bottom of said intermediate portion and having upright side walls disposed between said sides of said intermediate portion, at least portions of said side walls being disposed in vertically overlapped relation and interlocked with the guide means against separation in at least one vertical direction, said guide means extending laterally with respect to said side walls, and a rubberized fabric belt supported on said liner, said belt and liner having vertical edges elongated lengthwise of the belt and engageable with each other for guiding the belt out of contact with the metal side portion of the channel to prevent production of soot particles through abrasion between the belt and the channel, said liner and channel being disposed in mutually supporting relation, said liner providing a relatively low coefficient of friction for the belt to accommodate sliding thereof thereupon whereby inhibiting the development of static electrical charges on the belt and attraction thereby of said soot particles.

2. In a message conveyor, a plurality of elongated track sections of soft, erodable material such as aluminum, a liner mounted on the track sections, means interlocking the liner and track sections in mutually rigidifying relation, said liner bridging the sections and interlocking the same with each other, a belt having a rubberized fabric composition slidably mounted on said liner, said belt and liner having surfaces extending transversely of the belt in guided engagement with each other for preventing the belt from engaging and abrading the soft material whereby creating soot particles, said liner being of hard metal providing a relatively low coefficient of friction and serving as a conductor of static electrical charges to dissipate them from the belt.

3. In a message conveyor, an aluminum track having a medial U-shaped portion terminating in upwardly bowed laterally spaced beads with dependent outer flanges, outward extensions projecting laterally from the flanges, wing sections projecting diagonally upwardly from the extensions and providing a message trough therewith, and a U-shaped wear member fitted within the medial portion and having an upper edge bead structure overlapping respective beads and providing upwardly convexed longitudinal belt guiding and supporting upper edges, said upper bead structure rigidifying said wear member and substantially increasing its transverse strength to eliminate sagging, and said track comprising a plurality of end to end disposed lengths, and said wear member comprising a plurality of end to end lengths bridging the junctures of the track lengths and said bead portions on the wear member snugly interlocked with the beads on the track, and said wear member and medial portion having vertically spaced bottom walls and a fastening element between said walls bridging adjacent lengths of said track, and means securing the element to the track lengths.

4. In a message conveyor, an aluminum track having a medial U-shaped portion terminating in upwardly bowed laterally spaced beads with dependent outer flanges, outward extensions projecting laterally from the flanges, wing sections projecting diagonally upwardly from the extensions and providing a message trough therewith, and a U-shaped wear member fitted within the medial portion and having an upper edge bead structure overlapping respective beads and providing upwardly convexed longitudinal belt guiding and supporting upper edges, said upper bead structure rigidifying said wear member and substantially increasing its transverse strength to eliminate sagging, and said track comprising a plurality of end to end disposed lengths, and said wear member comprising a plurality of end to end lengths bridging the junctures of the track lengths and said bead portions of the wear member snugly interlocked with the beads on the track, and said wear member and medial portion having vertically spaced bottom walls and a fastening element between said walls bridging adjacent lengths of said track, and means securing the element to the track lengths and said wing sections having outer edge tubular portions providing bores alignable lengthwise of the track, and pins extending at opposite ends into the bores of respective track lengths.

References Cited by the Examiner

UNITED STATES PATENTS

| | | | |
|---|---|---|---|
| 1,945,475 | 1/34 | Beardsley | 198—204 X |
| 1,973,041 | 9/34 | Birkmeyer | 198—193 X |
| 2,101,685 | 12/37 | Nisbet. | |
| 2,207,171 | 7/40 | Gibson | 238—10 |
| 2,743,003 | 4/56 | Allen | 198—189 |
| 2,866,538 | 12/58 | Goldberg | 198—189 |
| 3,042,185 | 7/62 | Welch | 198—204 X |
| 3,141,545 | 7/64 | Holland | 198—204 X |

SAMUEL F. COLEMAN, *Primary Examiner.*

JULIUS E. WEST, *Examiner.*